H. A. F. BELLACH.
TIRE CHAIN.
APPLICATION FILED SEPT. 23, 1920.

1,371,140.

Patented Mar. 8, 1921.
2 SHEETS—SHEET 1.

H. A. F. Bellach
INVENTOR

BY Victor J. Evans
ATTORNEY

H. A. F. BELLACH.
TIRE CHAIN.
APPLICATION FILED SEPT. 23, 1920.

1,371,140.

Patented Mar. 8, 1921.
2 SHEETS—SHEET 2.

H. A. F. Bellach INVENTOR

BY Victor J. Evans ATTORNEY

WITNESS:

UNITED STATES PATENT OFFICE.

HERMAN A. F BELLACH, OF WAUBAY, SOUTH DAKOTA.

TIRE-CHAIN.

1,371,140.     Specification of Letters Patent.     Patented Mar. 8, 1921.

Application filed September 23, 1920. Serial No. 412,344.

*To all whom it may concern:*

Be it known that I, HERMAN A. F. BELLACH, a citizen of the United States, residing at Waubay, in the county of Day and State of South Dakota, have invented new and useful Improvements in Tire-Chains, of which the following is a specification.

This invention relates to non-skid or anti-slip chains for use on the wheels or tires of motor vehicles and has for its object the provision of a peculiarly formed non-slip device which includes a plurality of specially formed plates curved longitudinally and transversely for conforming engagement upon a tire and also having angularly deflected ends so arranged that in the event that a tire tends to slip circumferentially, that is spin idly in mud or the like, the mud or other material engaging between the tire and the plates will swing them outwardly so that they will form, in effect, mud hooks which will positively give the proper traction even under very adverse conditions.

An important object is the provision of an anti-slipping device of this character in which the individual peculiarly constructed plates are carried by cross chains connected with side chains extending circumferentially of the wheel.

An additional object is the provision of a device of this character which will be simple and inexpensive in construction, easy to apply, efficient in use, durable in service, and a general improvement in the art.

With the above and other objects and advantages in view, the invention consists in the details of construction to be hereinafter more fully described and claimed and illustrated in the accompanying drawings in which—

Figure 1:
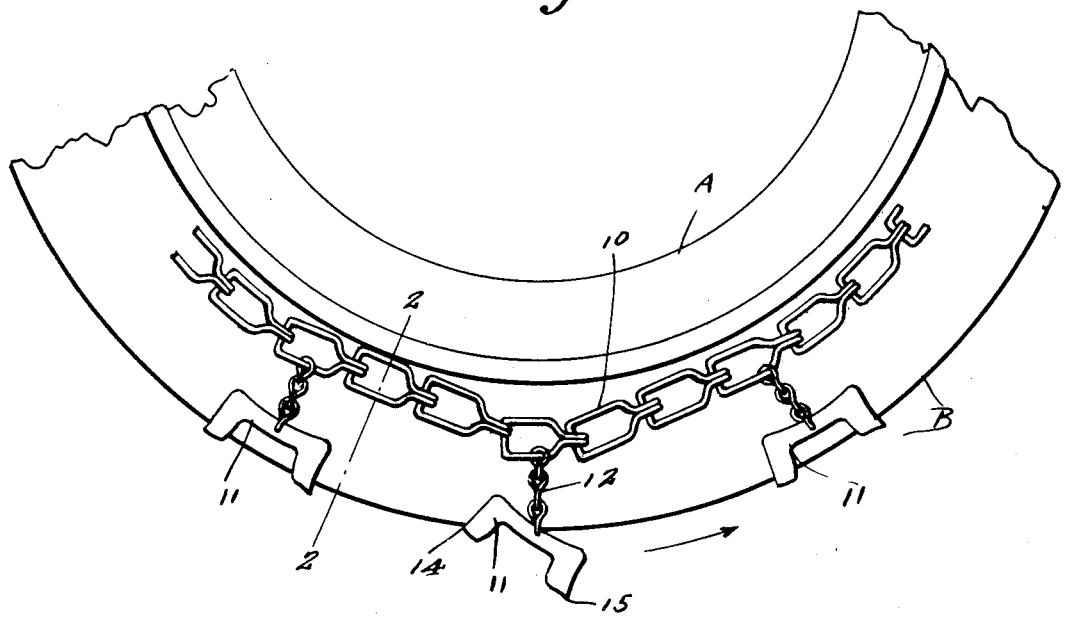
Figure 3:
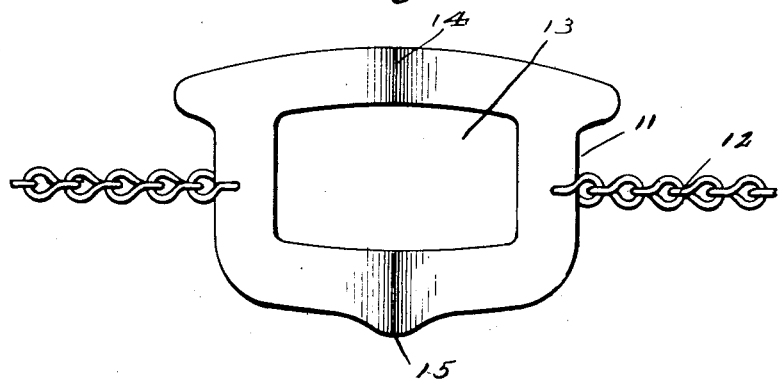
Figure 2:
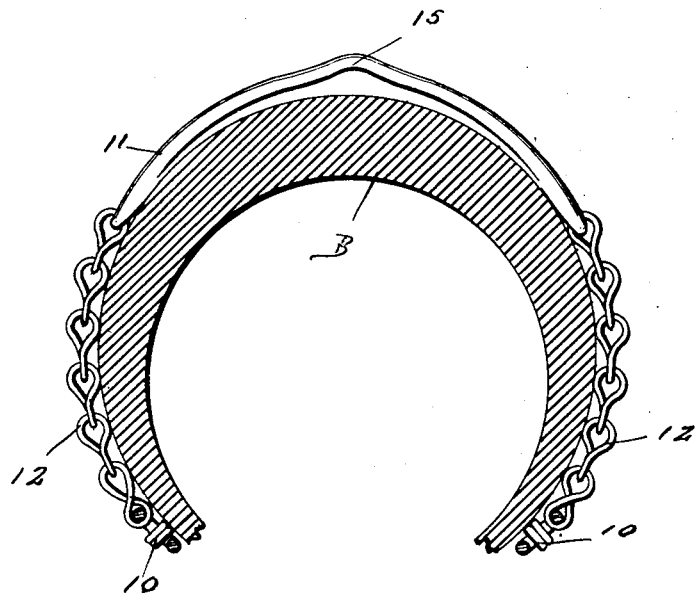
Figure 4:
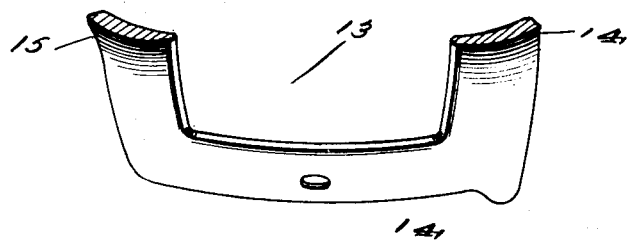

Figure 1 is a side elevation of an automobile wheel showing my device in applied position, Fig. 2 is a cross sectional view on the line 2—2 of Fig. 1 on a larger scale, Fig. 3 is a plan view of one of the plates, and Fig. 4 is a sectional view therethrough.

Referring more particularly to the drawings, the letter A designates an automobile wheel carrying a tire B. In carrying out my invention I provide a pair of side chains 10 which are disposed against opposite sides of the wheel in the ordinary manner and which may have their ends connected by any suitable fastening means, the special design being immaterial. My invention also contemplates the use of a plurality of plates 11 arranged at spaced intervals and connected with the side chains 10 by short cross chains 12. Each of these plates 11 is formed as an open frame, that is its center is cut away, as shown at 13, and each plate is curved transversely and longitudinally for conforming engagement upon the tire, except that each plate has its opposite ends 14 and 15 laterally inclined or deflected. The purpose of this peculiar formation of the plates is that in the event that a wheel equipped with my device tends to spin idly, mud or other slippery material will engage beneath the sides 15 of the plates and cause the plates to swing outwardly with respect to the wheel or tire, as clearly shown in Fig. 1, whereupon these plates will act in the same capacity as mud hooks and give proper traction so as to avoid slipping of the wheel.

From the foregoing description and a study of the drawings it will be apparent that I have thus provided a simply constructed and consequently inexpensive non-slipping device which will be easy of application, and which will efficiently perform all the functions for which it is intended. It is of course apparent that my device acts in the ordinary non-skid capacity as well as in preventing spinning of a wheel.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A non-skid device comprising a pair of flexible members disposed upon opposite sides of a wheel, the wheel carrying a tire, and a plurality of plates disposed between and connected with said flexible members and disposed upon the periphery of the tire, each of said plates being formed as an open frame transversely curved for conforming engagement with the tire, each plate being offset at its center line whereby to be spaced slightly from the tire, and each plate being formed at its forward edge with a projection extending beyond the forward edge and inclined with respect to the periphery of the tire whereby to bite into the mud or soft ground traveled over to cause a quantity of mud or earth to lodge between the plate and the tire.

In testimony whereof I affix my signature

HERMAN A. F. BELLACH.